United States Patent
Kessler

(10) Patent No.: US 7,093,724 B1
(45) Date of Patent: Aug. 22, 2006

(54) BICYCLE ADVERTISING RACK

(76) Inventor: Brad Kessler, 3039 E. St., San Diego, CA (US) 92102

( * ) Notice: Subject to any disclaimer, the term of this patent is extended or adjusted under 35 U.S.C. 154(b) by 75 days.

(21) Appl. No.: 10/992,552

(22) Filed: Nov. 18, 2004

(51) Int. Cl.
*A47F 7/00* (2006.01)
*G09F 3/00* (2006.01)

(52) U.S. Cl. ............................ 211/17; 211/85.7; 211/5; 40/333; 40/607.12

(58) Field of Classification Search ................. 211/17, 211/85.7, 5, 7, 18, 22, 107; 40/333, 607.12, 40/607.14; 52/737.2, 736.2; 248/218.4, 248/219.1, 219.2
See application file for complete search history.

(56) References Cited

U.S. PATENT DOCUMENTS

| | | | | |
|---|---|---|---|---|
| 491,475 A | * | 2/1893 | Elliot | 211/22 |
| 1,499,169 A | * | 6/1924 | Gill | 40/607.12 |
| 2,928,641 A | * | 3/1960 | Pfaff, Jr. | 248/219.1 |
| 3,102,352 A | * | 9/1963 | White | 40/607.11 |
| D391,301 S | * | 2/1998 | Davis | D20/41 |
| D419,195 S | * | 1/2000 | Herbst | D20/19 |
| 6,233,858 B1 | * | 5/2001 | Brach et al. | 40/660 |

* cited by examiner

*Primary Examiner*—Richard E. Chilcot, Jr.
*Assistant Examiner*—Lindsay M. Maguire
(74) *Attorney, Agent, or Firm*—Goldstein Law Offices, P.C.

(57) ABSTRACT

A bicycle advertising rack which is selectively attached to an existing parking meter, and which may be suitably used for locking up a bicycle in areas such as business areas having few or no bicycle racks or other objects to which the bicycle may be effectively secured. The bicycle advertising rack comprises a U-shaped tube having an upper arm and a lower arm; each having an end having a cylindrical collar affixed thereunto. The post of the parking meter extends concentrically through each of the collars, and forms a closed loop therewith, through which a chain or a U-shaped lock may be extended while "locking" a bicycle to the parking meter. The bicycle advertising rack has two flat plates for selectively displaying an advertisement thereupon.

9 Claims, 2 Drawing Sheets

BICYCLE ADVERTISING RACK

BACKGROUND OF THE INVENTION

1. Field of the Invention

The invention generally relates to a bicycle rack to which an existing bicycle may be locked, and in particular relates to a bicycle rack which is selectively attached to an existing parking meter, and which has flat plates for selectively displaying an advertisement thereupon.

2. Description of the Related Art

Hundreds of thousands of bicycles are stolen every year from outdoor locations. To minimize the possibility of theft, many bicycle owners secure their bicycles to a stationary object such as a bicycle rack with a chain and lock or with a U-shaped lock. However, certain areas, such as business areas, have few or no bicycle racks or other objects to which a bicycle may be effectively secured. Moreover, many such areas would benefit from the provision of an effective advertising display system for informing persons in the area of various retail outlets in the area, or for general advertisement purposes. Accordingly, there is a need for a bicycle rack which is selectively attached to an existing parking meter, and which has flat plates for selectively displaying an advertisement thereupon.

A variety of bicycle racks have been devised for enabling a user to selectively lock an existing bicycle thereunto, for preventing a would-be thief from absconding with the bicycle. While the existing bicycle racks may be suitable for the particular purpose employed, or for general use, they would not be as suitable for the purposes of the present invention as disclosed hereafter.

SUMMARY OF THE INVENTION

It is an object of the invention to provide a bicycle advertising rack that may be suitably used in areas such as business areas that have few or no bicycle racks or other objects to which a bicycle may be effectively secured. Accordingly, the bicycle advertising rack is selectively attachable to an existing parking meter, and may be suitably used in areas such as business areas having few or no bicycle racks or other objects to which a bicycle may otherwise be effectively secured.

It is another object of the invention to provide a bicycle rack that may additionally be utilized for provision of an effective advertising display for informing persons in the area of various retail outlets in the area, or for general advertisement purposes. Accordingly, the bicycle advertising rack has two flat plates for selectively displaying an advertisement thereupon.

Further objects of the invention will become apparent in the detailed description of the invention that follows.

The invention is a bicycle advertising rack which is selectively attached to an existing parking meter, and which may be suitably used for locking up a bicycle in areas such as business areas having few or no bicycle racks or other objects to which the bicycle may be effectively secured. The bicycle advertising rack comprises a U-shaped tube having an upper arm and a lower arm; each having an end having a cylindrical collar affixed thereunto. The post of the parking meter extends concentrically through each of the collars, and forms a closed loop therewith, through which a chain or a U-shaped lock may be extended while "locking" a bicycle to the parking meter. The bicycle advertising rack has two flat plates for selectively displaying an advertisement thereupon.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
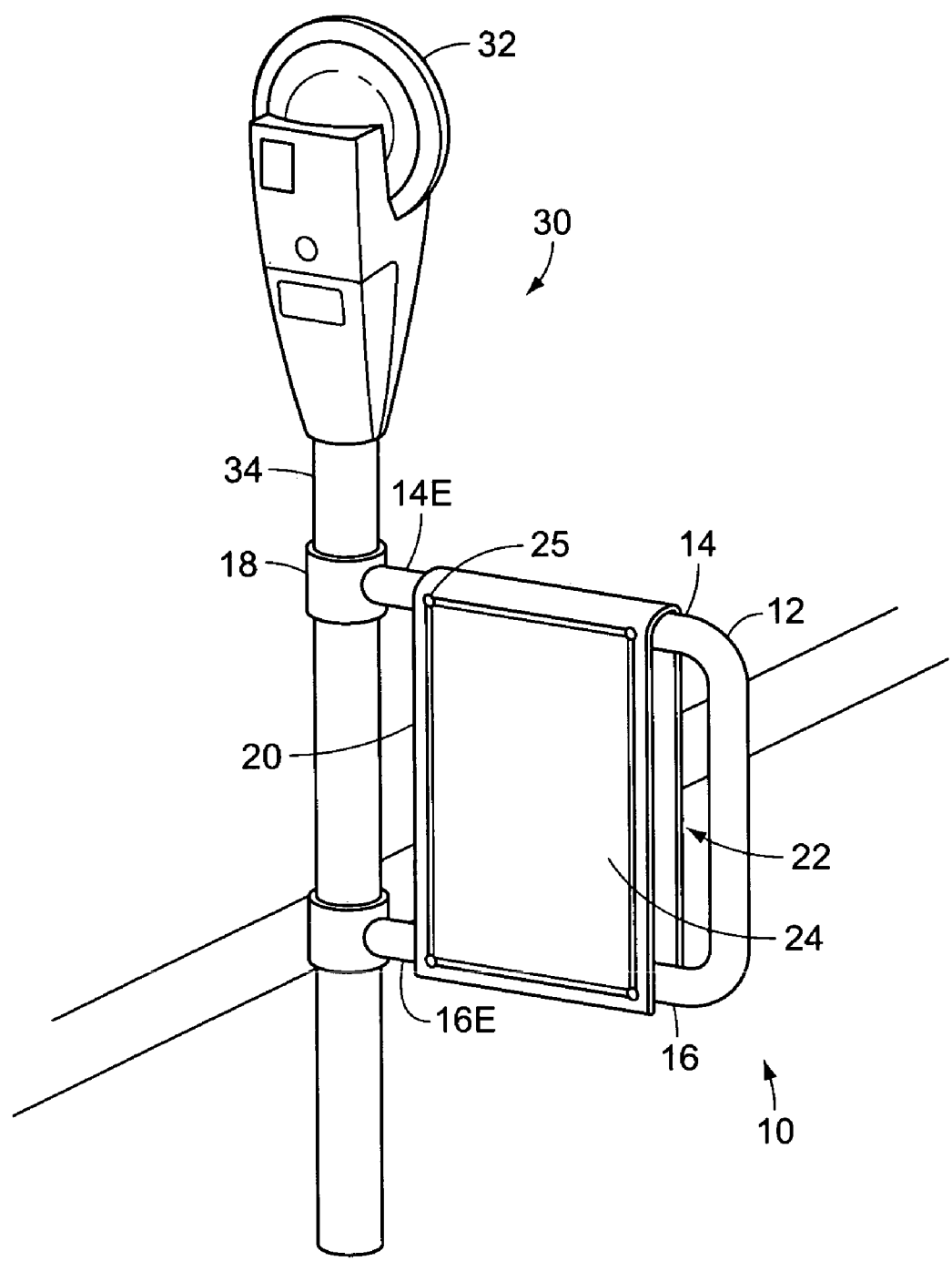
FIG. 1 is a perspective view of a bicycle advertising rack, after selective attachment to an existing parking meter.
Figure 2:
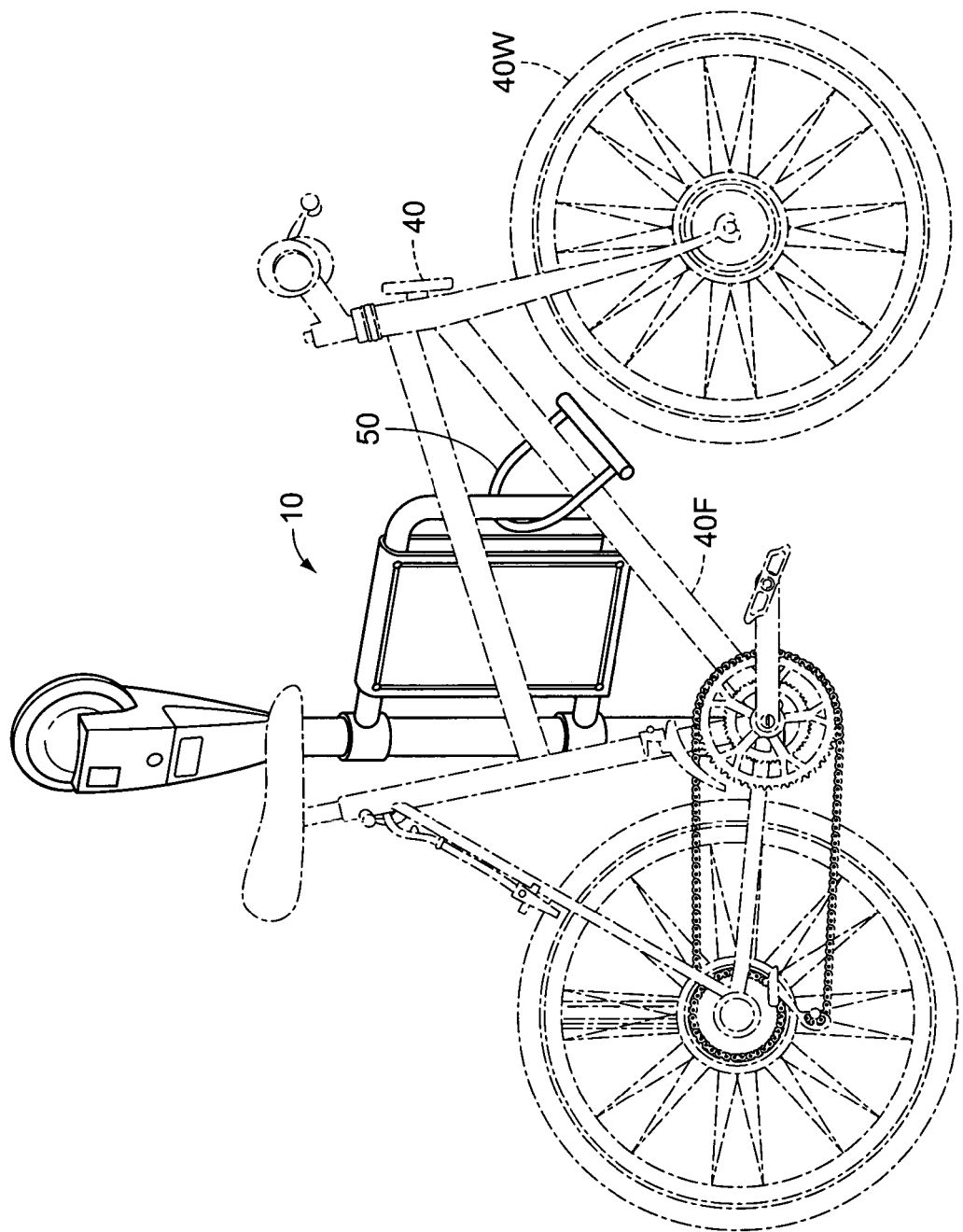
FIG. 2 is a perspective view of a bicycle advertising rack, as in FIG. 1, after an existing bicycle has been locked thereunto.

FIG. 1 illustrates a bicycle advertising rack 10, after selective attachment to an existing parking meter 30. The bicycle advertising rack 10 enables a user to selectively lock an existing bicycle to the parking meter 30, in order to prevent theft of the bicycle. The bicycle advertising rack 10 comprises a U-shaped tube 12 having an upper arm 14 and a lower arm 16. The arms, 14 and 16, are substantially horizontally situated after the bicycle advertising rack 10 has been attached to the parking meter 30. Each of the arms, 14 and 16, terminates at an end, 14E and 16E, respectively. Each of the ends, 14E and 16E, has a cylindrical collar 18 affixed thereunto. The parking meter 30 has a meter portion 32 and has a cylindrical post portion 34 having an external diameter. The post portion 32 extends from and is rigidly affixed to the ground, generally by cementing the post portion 34 within the ground. Each of the cylindrical collars 18 has an inner diameter that is slightly larger than the external diameter of the post portion 34 of the parking meter 30. The post portion 34 extends concentrically through each of the collars 18. The cylindrical collars 18 are selectively affixed to the post portion 34 prior to deployment of the bicycle advertising rack 10. A variety of methods are contemplated for selectively affixing the collars 18 to the post portion 34, including the use of bolts or by welding the collars 18 to the post portion 34. The arms, 14 and 16, in conjunction with the post portion 34 of the parking meter 30, form a closed loop 22, through which a chain or a U-shaped lock of a bicycle may be extended, in order to prevent a would-be thief from stealing the bicycle. FIG. 2 illustrates a view as in FIG. 1, except after an existing bicycle 40 has been locked to the parking meter 30 and the rack 10 by extending a U-shaped lock 50 through the frame 40F and front wheel 40W of the bicycle 40, and also through the closed loop 22, and by subsequently locking the lock 50.

The bicycle advertising rack 10 has two opposing rectangular plates 20 that extend between the upper arm 14 and the lower arm 16 of the rack 10. The plates 20 are affixed to each of the arms, 14 and 16, by screws 25. Alternately, of course, the plates 20 may be bolted or welded to the arms, 14 and 16. The plates 20 are used for selectively displaying an existing substantially rectangular advertisement. Each of the plates 20 has a side that is covered by a rectangular particleboard 24. An existing advertisement or promotional message is selectively affixed to the particleboard 24 by means such as pasting or gluing the advertisement to the particleboard 24. Accordingly, the bicycle advertising rack 10 may be used for conveying an advertising message, as well as for preventing a bicycle 40 from being stolen.

The U-shaped tube 12 of the bicycle advertising rack 10 is preferably constructed from a case hardened metal such as case hardened steel, so that a would-be thief will not be able to cut the bicycle advertising rack 10 from the parking meter 30. It is contemplated that a plurality of the bicycle advertising racks 10 may be suitably utilized by a municipality for enabling individuals to lock their bicycles 40 to parking meters 30 in areas having few or no bicycle racks or other fixed objects to which a bicycle 40 may be locked. Use of the bicycle advertising rack 10 is apparent from the above description. Accordingly, no further description of method of use thereof is warranted.

In conclusion, herein is presented a bicycle rack which is selectively attached to an existing parking meter, and through which a chain or U-shaped lock may be extended while locking up a bicycle, and which has flat plates for selectively displaying an advertisement thereupon. The invention is illustrated by example in the drawing figures, and throughout the written description. It should be understood that numerous variations are possible, while adhering to the inventive concept. Such variations are contemplated as being a part of the present invention.

What is claimed is:

1. A bicycle advertising rack for selective attachment to an existing parking meter, said parking meter having a meter portion and a post portion having an external diameter, said bicycle advertising rack for enabling a user to selectively lock an existing bicycle to the post portion of the parking meter with an existing chain and lock, in order to deter theft of the bicycle, and also for selectively displaying an existing advertisement, comprising:

a U-shaped tube having an upper arm and a lower arm, wherein each of the arms terminates at an end having a cylindrical collar affixed thereunto, each of said cylindrical collars having an inner diameter that is larger than the external diameter of the post portion of the parking meter, wherein after selectively affixing the rack to the parking meter, the post portion extends concentrically through each of the collars, the collars are selectively affixed to the post portion, and the arms, in conjunction with the post portion of the parking meter, form a closed loop; and two opposing plates that extend between the upper arm and the lower arm of the U-shaped tube, for selectively displaying an existing advertisement, each of the plates having a side that is covered by a particleboard, wherein an existing advertisement is selectively affixed to the particleboard in order that the bicycle advertising rack may be used for conveying an advertising message, as well as for preventing the bicycle from being stolen; and wherein the bicycle is locked to the parking meter and the rack by extending a chain through a portion of the bicycle, and also through the closed loop, and by subsequently locking the lock.

2. The bicycle advertising rack as recited in claim 1, wherein the arms are substantially horizontally situated after the bicycle advertising rack has been attached to the post of the parking meter.

3. The bicycle advertising rack as recited in claim 2, wherein each of the opposing plates is substantially rectangular.

4. The bicycle advertising rack as recited in claim 3, wherein each of the particle boards is substantially rectangular.

5. The bicycle advertising rack as recited in claim 4, wherein the U-shaped tube is constructed from case hardened steel.

6. The bicycle advertising rack as recited in claim 5, wherein the advertisement is selectively affixed to the particleboard by pasting the advertisement to the particleboard.

7. The bicycle advertising rack as recited in claim 6, wherein the collars are attached to the post portion by welding the collars to the post portion.

8. The bicycle advertising rack as recited in claim 7, wherein the plates are affixed to each of the arms by screws.

9. The bicycle advertising rack as recited in claim 7, wherein the plates are affixed to each of the arms by welding the plates to the arms.

* * * * *